E. E. FLEMING.
SELF LOCKING CHAIN LINK.
APPLICATION FILED MAR. 29, 1917.
1,246,900.
Patented Nov. 20, 1917.
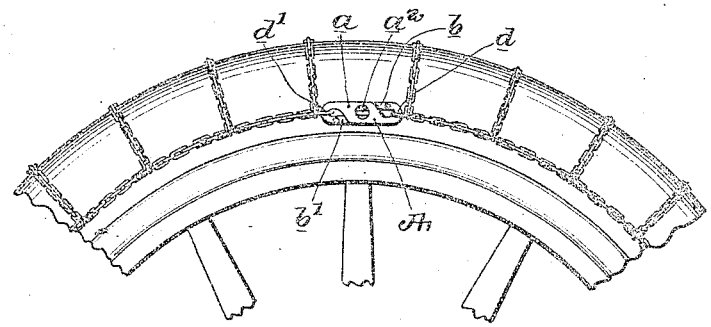
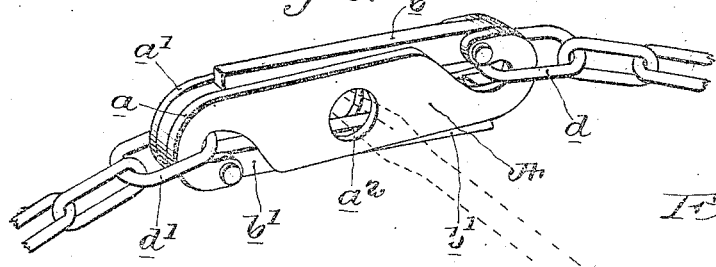
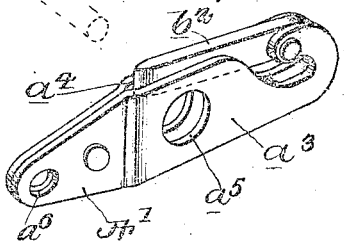
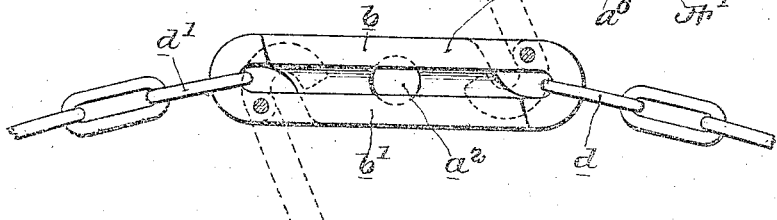
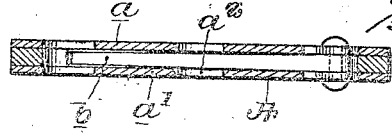
Witness
Benjamin B. Dowell
A. Pauline Davis
Inventor
Edward E. Fleming
By Dowi & Dowell
His Attorneys

UNITED STATES PATENT OFFICE.

EDWARD E. FLEMING, OF HAGERSTOWN, MARYLAND.

SELF-LOCKING CHAIN-LINK.

1,246,900.  Specification of Letters Patent.  Patented Nov. 20, 1917.

Application filed March 29, 1917. Serial No. 158,283.

*To all whom it may concern:*

Be it known that I, EDWARD E. FLEMING, a citizen of the United States, residing at Hagerstown, in the county of Washington and State of Maryland, have invented certain new and useful Improvements in Self-Locking Chain-Links; and I do hereby declare the following to be a full, clear, and exact description of the invention, such as will enable others skilled in the art to which it appertains to make and use the same.

This invention relates to chain connecting devices and more particularly to that class of self-locking connecting devices for use in connection with anti-skid chains for automobiles adapted to connect the ends of the webbed chains after they have been placed over the tire, and to fasten such ends and hold them securely so that they may not slip off nor become unfastened while in use upon the wheel.

The objects of my invention are to provide a simple, light and inexpensive device of the character referred to, which will insure a positive connection whether used as a chain link or other fastening means, and which will be efficient and reliable in practical use.

The invention will first be hereinafter more particularly described, with reference to the accompanying drawings, which are to be taken as a part of this specification, and then pointed out in the claims at the end of the description.

In the drawings, Figure 1 is a side elevation of my device illustrating its use in connection with an anti-skid chain for automobiles;

Fig. 2 is a perspective view of the device showing its connection with the links of a chain, and indicating in dotted lines a tool inserted between the shanks of the pivoted link members for forcing them apart;

Fig. 3 is a side elevation of my improved device used as a link with one of the side plates removed to better illustrate the position of the link members when locked, said members being indicated in unlocked position by dotted lines; and Fig. 4 is a longitudinal section of said device, and Fig. 5 illustrates a modified form of my invention.

In said drawings, in which the same reference letters are used to denote corresponding parts in different views, the letter A may denote my improved self-locking chain link composed of two oppositely disposed oblong plates $a$, $a^1$ and intermediate link members $b$, $b^1$; said plates having hook portions at each end extending in opposite directions, and one or both plates having an aperture $a^2$ therein intermediate its ends, but preferably centrally disposed registering apertures to permit an ordinary screwdriver or pocket key to be inserted between the link members to pry them apart; said link members being pivotally secured one at each end of the side plates $a$ and $a^1$. Said link members $b$ and $b^1$ are each preferably constructed with a hook at one end and pivoted at their respective crooked ends between the side plates with their shanks confined between and substantially flush with the outer edges of the plate members, in order to provide a continued and uniform surface along said edges when the link members are in locked position, (see Figs. 1 and 3).

The extremities of the link members $b$ and $b^1$ are preferably beveled or inclined so that when the shank portions of said members are pressed inward toward each other between the side plates the beveled end of the shank of one link member will contact with the reversely inclined end of the hook on the other member and lock the two link members between the side plates, and when so pressed together between the side plates they will be held under stress and pressure each against the other and thereby retained and securely locked between the side plates so that neither may be pushed out unless simultaneously the other is pushed out also.

In use the end links $d$ and $d^1$ of a chain or chains are slipped over the shank portions of the link members $b$ and $b^1$ when in the dotted line position shown in Fig. 3, and the link members are then pressed inward toward each other until they are locked together as above described, with the links $d$ and $d^1$ slipped into the hook portions of the side plates and link members where they are retained until released. In order to release the link members, a screw-driver or any like implement may be inserted in the aperture $a^2$, as indicated in dotted lines in Fig. 2, and the link members may be pried outwardly or apart so that their extremities are simultaneously relieved of the pressure under which they are held while folded upon each other between the side plates. In Fig. 2 the link members $b$ and $b^1$ are shown in released position just after they have been pried outward from the locked position. To release the chain links therefrom, each of the link members is then lifted free of their respective resting places in the same manner as a knife blade is pulled out from a jack-knife.

It will be understood of course that other forms of my improvement may be devised without departing from the spirit and scope of my invention, as for instance, the side plates may be formed integrally with a connecting web instead of two separate plates and the form of the hook on either the side plates or the link members may be varied, though the specific form shown is preferred.

The advantages of my improvement over various other forms of devices used for a similar purpose are obvious. The improved device may be carried loosely and entirely independent of the chains, and may be put to use as an emergency link to patch up a broken chain or to join the ends of an automobile anti-skid chain without a special construction to accomplish the desired result. By reason of its lightness in weight it may be carried in one's pocket and may be quickly attached wherever desired whenever occasion for its use arises. It is impossible for it to become unfastened and its strength and adaptability to ordinary or emergency use is of considerable value over other devices heretofore constructed for similar purposes.

In Fig. 5 of the drawings I have illustrated a modification in which the coupling device is provided with hooks at one end only and with eyes or other means at the other end thereof for connection with a link at one end of a chain. In the form shown, a single locking member of the same form as the corresponding members shown in Figs. 1 to 4 of the drawings is pivoted between the plates in the same manner, the free end of the shank being constructed to engage a shoulder formed by offset portions of the side plates near one end, and in this construction the aperture in the side plate or plates is preferably located near that end of the plates between which the free end of the shank of the hook member is fitted, and I desire it to be understood that this and various other modifications may be used without departing from the spirit and scope of my invention.

In said Fig. 5, the letter $A^1$ may represent the modified form of the coupling device above described comprising the oppositely disposed hooked oblong plates $a^3$ and $a^4$ and having a locking member $b^2$ pivoted between the plates at one end in the manner described, one or both of said plates being provided with an aperture $a^5$ at an intermediate point, said plates also having an aperture $a^6$ for attaching a chain link or the like thereto.

Having thus described my invention, what I claim as new and desire to secure by Letters Patent is:

1. A self-locking chain link comprising parallel plates spaced apart and having hooks at their ends extending in opposite directions from opposite ends of the plates, and link members each having a hook at one end and a comparatively long shank fitting between said plates and pivoted thereto at its hooked end, said hook extending from the terminals of the plate-hooks in a reverse direction thereto toward the opposite edges of the plates.

2. A self-locking chain link comprising parallel plates spaced apart and having hooks at their ends extending in opposite directions from opposite ends of the plates, and link members each having a hook at one end and a comparatively long shank fitting between said plates and pivoted thereto at its hooked end, said hook extending from the terminals of the plate-hooks in a reverse direction thereto toward the opposite edges of the plates, the free ends of the shank and hook of each link member being beveled and adapted for interlocking engagement when the shanks are moved in between the plates.

3. A chain connecting link comprising parallel plates having oppositely disposed hooks and an aperture intermediate its ends and two intermediate link members placed in juxtaposition between said plates and each formed with a hook at one end pivoted between the terminals of the plate hooks and extending in a reverse direction thereto and a shank having its free end beveled for engagement with the reversely inclined hooked end of the other member when in closed position between the plates.

4. A chain connecting link comprising a member formed with two oppositely disposed parallel plates having hooks at opposite ends extending in opposite directions and an aperture disposed intermediate its ends; two link members each having a hook and a comparatively long shank portion placed between said parallel plates and each pivoted near the hooked end thereof to said plates and formed with interengaging beveled extremities adapted to securely lock said link members in closed position between said plates.

5. A self-locking chain link comprising parallel plates spaced apart and having hooks at their ends extending in opposite directions from opposite ends of the plates, and link members each having a hook at one end and a comparatively long shank fitting between said plates and pivoted thereto at its hooked end, said hook extending from the terminals of the plate-hooks in a reverse direction thereto toward the opposite edges of the plates, the free ends of the shank and hook of each link member being beveled and adapted for interlocking engagement when the shanks are moved in between the plates, and said plates being apertured intermediate their ends for inserting a tool to force the link members apart.

6. A device for connecting chain links comprising oblong plates having at one end a pair of hooks adapted to engage a chain link, and means at the other end thereof adapted to connect with another link, whereby the adjoining ends of a chain may be connected, and a link member fitted between said plates and pivoted thereto; said link member having a hook at one end extending between and in a reverse direction to the plate hooks and a shank bridging the space between the body of the plates and the ends of the hooks thereon, the free end of the shank being adapted for interlocking engagement with means at the end of said plates remote from said pair of hooks.

7. A device for connecting adjoining ends or links of a chain, comprising a pair of oblong plates having end-hooks which spring from one edge thereof and have return bends which terminate in the plane of the other edge thereof and overlie the shanks of the hooks, and a link member pivoted between the terminals of the plate-hooks and having a hook thereon which extends from said pivot in a reverse direction to the plate-hooks and a shank which extends between said plates toward the end thereof farthest from said pivot; said plates having means thereon with which said shank is drawn into binding contact by the pull upon the hook of said link.

In testimony whereof I affix my signature in the presence of two witnesses.

EDWARD E. FLEMING.

Witnesses:
W. E. PATTISON,
CHAS. F. STROLE.